(12) United States Patent
Mittapalli et al.

(10) Patent No.: US 9,178,835 B2
(45) Date of Patent: Nov. 3, 2015

(54) INFORMATION HANDLING SYSTEM EMPLOYING UNIFIED MANAGEMENT BUS

(71) Applicant: Dell Products L.P., Round Rock, TX (US)

(72) Inventors: Balaji Mittapalli, Austin, TX (US); Stephen Cochran, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/629,204

(22) Filed: Feb. 23, 2015

(65) Prior Publication Data

US 2015/0163169 A1    Jun. 11, 2015

Related U.S. Application Data

(63) Continuation of application No. 13/411,239, filed on Mar. 2, 2012, now abandoned, which is a continuation of application No. 11/683,196, filed on Mar. 7, 2007, now Pat. No. 8,150,953.

(51) Int. Cl.
*H04L 12/947* (2013.01)
*H04L 12/24* (2006.01)

(52) U.S. Cl.
CPC ............... *H04L 49/25* (2013.01); *H04L 12/24* (2013.01); *H04L 41/00* (2013.01)

(58) Field of Classification Search
CPC ...................................................... H04L 49/25
See application file for complete search history.

(56) References Cited

U.S. PATENT DOCUMENTS

| | | | |
|---|---|---|---|
| 4,939,516 A | 7/1990 | Early | 341/143 |
| 5,039,989 A | 8/1991 | Welland et al. | 341/143 |
| 6,243,756 B1 | 6/2001 | Whitmire et al. | 709/232 |
| 6,594,712 B1 * | 7/2003 | Pettey et al. | 710/22 |
| 6,639,532 B1 | 10/2003 | Liu et al. | 341/143 |
| 6,909,388 B1 | 6/2005 | Quiquempoix et al. | 341/143 |
| 6,952,176 B2 | 10/2005 | Frith et al. | 341/143 |
| RE39,514 E * | 3/2007 | Shemla et al. | 370/402 |
| 7,318,089 B1 * | 1/2008 | Stachura et al. | 709/223 |
| 7,587,587 B2 * | 9/2009 | Buer et al. | 713/153 |
| 8,166,474 B1 * | 4/2012 | Delco et al. | 718/1 |
| 2002/0126680 A1 * | 9/2002 | Inagaki et al. | 370/401 |
| 2003/0115397 A1 * | 6/2003 | Hawkins et al. | 710/305 |
| 2004/0062267 A1 * | 4/2004 | Minami et al. | 370/463 |

(Continued)

OTHER PUBLICATIONS

Anderson "Getting the Most out of Delta-Sigma Converters" Texas Instruments Incorporated (7 pages).

(Continued)

*Primary Examiner* — Khaled Kassim
*Assistant Examiner* — Saad A Waqas
(74) *Attorney, Agent, or Firm* — Baker Botts L.L.P.

(57) ABSTRACT

An information handling system includes a host including a central processing unit, a first management controller (MC) enabled to communicate with the host, and a network interface resource (NIR) in communication with the host and operable to enable the information handling system to communicate via an external network. The NIR includes a unified management module (UMM) operable to receive and route a local management packet, sent from the host, to the first management controller via a first unified management bus (UMB) and further operable to receive and route a remote management packet, sent from a remote resource via the external network, to the first management controller via the first UMB.

13 Claims, 2 Drawing Sheets

(56) References Cited

U.S. PATENT DOCUMENTS

| | | | |
|---|---|---|---|
| 2005/0066218 A1* | 3/2005 | Stachura et al. | 714/3 |
| 2006/0005070 A1 | 1/2006 | Zimmer et al. | 714/5 |
| 2006/0106968 A1* | 5/2006 | Wooi Teoh | 710/316 |
| 2006/0215659 A1 | 9/2006 | Rothman et al. | 270/392 |
| 2006/0242280 A1 | 10/2006 | Zimmer et al. | 709/222 |
| 2007/0002826 A1* | 1/2007 | Bennett et al. | 370/351 |
| 2007/0233833 A1* | 10/2007 | Wang | 709/223 |
| 2008/0080496 A1* | 4/2008 | Slaight | 370/389 |
| 2008/0147858 A1* | 6/2008 | Prakash et al. | 709/225 |
| 2008/0178181 A1* | 7/2008 | Gulick | 718/102 |
| 2008/0256239 A1* | 10/2008 | Gilde et al. | 709/226 |
| 2009/0154980 A1* | 6/2009 | Coletrane et al. | 400/624 |

OTHER PUBLICATIONS

"16-Bit Analog-to-Digital Converter with Onboard Reference" Texas Instruments Incorporated (19 pages).

* cited by examiner

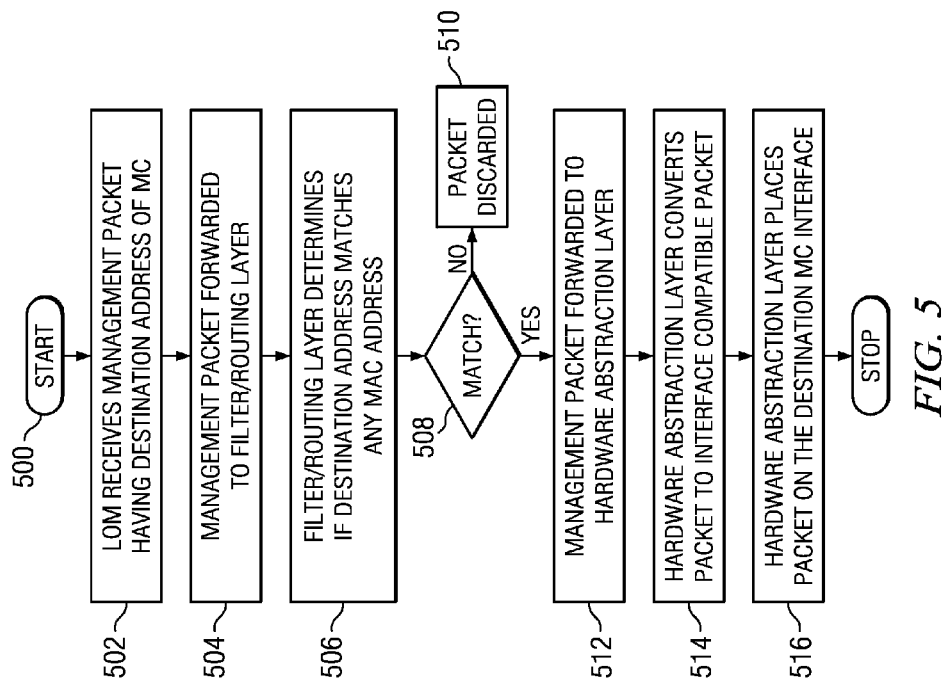
FIG. 5
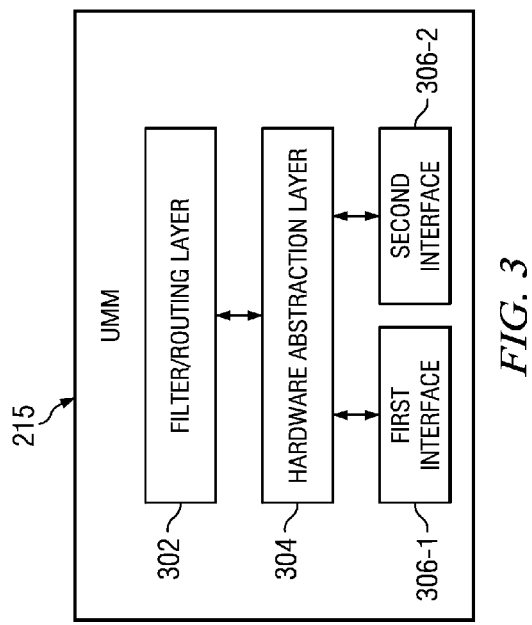
FIG. 3
FIG. 4

INFORMATION HANDLING SYSTEM EMPLOYING UNIFIED MANAGEMENT BUS

CROSS-REFERENCE TO RELATED APPLICATIONS

This application is a continuation of U.S. patent application Ser. No. 13/411,239 filed Mar. 2, 2012; which is a continuation of U.S. patent application Ser. No. 11/683,196 filed on Mar. 7, 2007, now U.S. Pat. No. 8,150,953 granted Apr. 3, 2012, the contents of which are incorporated herein in their entirety by reference.

TECHNICAL FIELD

The present invention is related to information handling systems and, more particularly, the management of information handling systems, both remote and otherwise.

BACKGROUND OF THE INVENTION

As the value and use of information continues to increase, individuals and businesses seek additional ways to process and store information. One option for processing and storing information is an information handling system. An information handling system generally processes, compiles, stores, and/or communicates information or data for business, personal, educational, governmental, or other purposes thereby allowing users to take advantage of the value of the information.

Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is commonly referred to as a server or server system. As suggested by its name, a server system might be described as an information handling system that provides a service to one or more other information handling systems. Server systems include, as examples, application servers dedicated to running specified software applications, database servers that provide database services, file servers that provide file services, web servers that communicate with HTTP (Hypertext transfer protocol) clients to receive and respond to HTTP requests, and numerous other types of servers.

An increasingly important aspect or feature of a server system is its system management resources including remote management resources. Although system management concepts are not exclusively applicable to server systems, they are particularly prevalent in such systems and the exemplary implementations of system management resources presented herein emphasize system management resources in the context of server systems. It is understood, however, that the system management features described herein may also be appropriate for other classes of information handling systems including, as examples, desktop systems, mobile systems including notebook or lap top systems and hand held systems.

System management features and requirements are growing at a rapid pace, as standards bodies such as the Distributed Management Task Force (DMTF) develop specifications to increase the interoperability of products developed by independent software and hardware vendors. Of particular focus among DMTF working groups and leaders in the server product space is the ability to manage servers out-of-band (OOB). OOB management refers to system console access provided, even in the event of primary network subsystem (hard and/or software) failure. OOB management can be done via a console server or via a remote access card (RAC) which has its own processor, memory, battery, network connection, and access to the system bus. OOB management is highly desirable because it permits system management when the primary data bus of the system, sometimes referred to as the system bus, fails. In band (IB) management, in contrast, generally refers to the use of the system bus to manage a system. OOB offers the prospect of managing a system precisely when the system is in need of management, i.e., when the system is not working.

In addition to the OOB/IB distinction, system management is also differentiated by whether the management is local or remote. For purposes of this disclosure, local management generally refers to management commands, messages, and the like that are generated by a central processing unit of a server and sent to a management controller. Remote management, as suggested by its name, refers generally to a management paradigm in which management commands, messages, and the like are transmitted and generated by a remote information handling system, i.e., an information handling system having processing and storage resource that are distinct from the processing and storage resources of the managed system. The remote information handling system and the managed system are also generally located in different locations.

Conventional implementations of system management generally implement local management using dedicated interfaces that may include drivers, hardware, and firmware. In contrast, remote management generally employs a conventional Ethernet-based IP interface, which is typically provided by a network controller (e.g., a conventional network interface card or NIC). In such remote management implementations, the NIC provides a direct path between the external network to which the remote resource is connected and the management controller embedded in the managed system, i.e., a path from remote resource to management controller that does not include the system bus of the managed system.

Differences in the implementations of local management and remote management are undesirable because host management software must address the management controllers differently depending on whether the management is local or remote. Moreover, it is challenging to provide full management support to servers having multiple instances and/or types of management controllers using conventionally implemented network controllers. Communication between two management controllers, for example, generally requires a dedicated inter-controller interface because conventional network controllers cannot simultaneously maintain interfaces for two different management controllers.

SUMMARY OF THE INVENTION

Therefore a need has arisen to address the issues discussed in the preceding paragraphs. The present disclosure describes an information handling system and method for unifying and simplifying system management in an effort to reduce distinctions between local and remote management from the perspective of management applications and to accommodate systems having multiple types of management controllers.

In one aspect, an information handling system includes a host including a central processing unit (CPU), a first management controller (MC) enabled to communicate with the host, and a network interface resource (NIR) in communication with the host and operable to enable the information handling system to communicate via an external network. The NIR includes a unified management module (UMM) operable to receive and route a local management packet, sent from the host, to the first management resource via a first unified management bus (UMB) and further operable to receive and route a remote management packet, sent from a remote resource via the external network, to the first management resource via the first UMB.

In another aspect a method of handling management packets in an information handling system includes receiving and routing, with a LOM, a first host management packet from a host to a first management controller receiving and routing, with the LOM, a first remote management packet from an external resource to the first management controller. In this manner the LOM routes remote packets for the first MC and local packets for the first MC to the first management controller over a first physical interface.

In yet another aspect, a computer program product includes computer executable instructions, stored on a computer readable medium, for handling management traffic in an information handling system, the instructions include instructions for detecting a destination address of a first management packet received from a host, instructions for detecting a destination address of a second management packet received from an external resource via an external network, and instructions for routing the first and second management packets to a first management controller via a first unified management bus responsive to determining that a destination address of the first and second management packets matches an address of a first management controller.

The present disclosure includes a number of important technical advantages. One technical advantage is the ability to make distinctions between local and remote management substantially transparent to a management application while leveraging well developed and pervasive networking interfaces. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 3 shows a conceptual representation of selected elements of an embodiment of a unified management module in accordance with the present invention;

FIG. 4 shows a table useful to determine whether a packet is destined for a management controller within a LAN on motherboard's domain; and FIG. 5 shows a flow diagram illustrating selected elements of a method of handling management traffic in an information handling system.

DETAILED DESCRIPTION OF THE INVENTION

Preferred embodiments of the invention and its advantages are best understood by reference to FIGS. 1-5 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
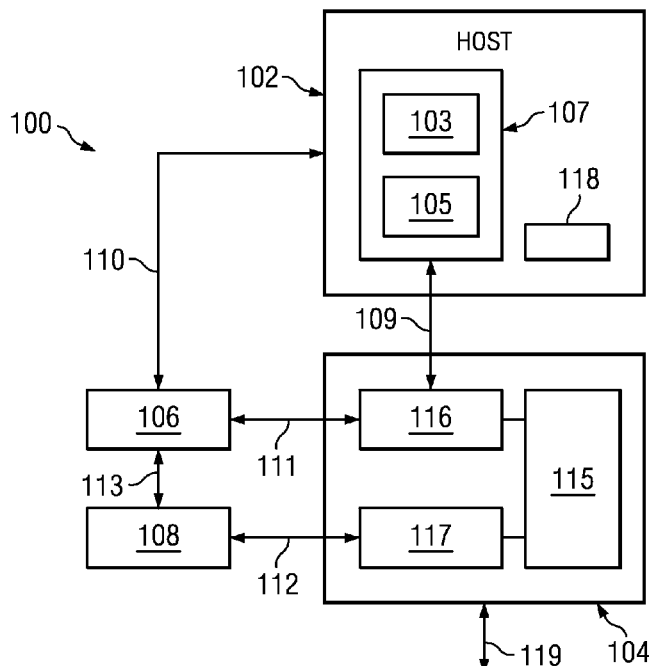
FIG. 1 shows selected elements of an information handling system depicted to illustrate some of the challenges to which the present disclosure is addressed.

Now referring to FIG. 1, selected elements of an information handling system 100 are depicted to illustrate some of the challenges to which the present disclosure is addressed. In the depicted embodiment, information handling system 100 includes a host 102, a network controller 104, a first management controller 106, and a second management controller 108.

Host 102 includes processing resources 103, e.g., one or more central processing units (CPUs) and storage resources 105 that are accessible to processing resources 103. Storage resources 105 encompass volatile storage or memory as well as persistent storage, e.g., disk storage, flash memory or other type of erasable read only memory (ROM), and the like. Host 102 may also include various other peripheral or I/O devices that will be familiar to those in the field of data processing system design.

Network controller 104 enables host 102 to communicate with external resources via external network 120. In the depicted implementation, network controller 104 includes a management filter 115 and interface specific firmware modules 116 and 117. First firmware module 116 provides an interface to the second management interface 111. Second management interface 111, which connects network controller 104 to first management controller 106 provides an OOB interface for remote management of first management controller 106. Second firmware module 117 provides an interface to third management interface 112. Third management interface 112, which connects network controller 104 to second management controller 108 provides an OOB interface for remote management of second management controller 108.

External network 120 may be a local area network (LAN), a wide area network, e.g., the Internet, or a combination thereof. As depicted in FIG. 1, an network connection 119 connects external network 120 to network controller 104.

Network connection 119 is preferably an industry standard network connection such as an Ethernet connection, but the type of network connection is an implementation detail and other types of network connections (e.g., token ring or ATM) and network connection medium (e.g., wireless) may also be used.

In some embodiments, network controller 104 is referred to as a LAN on motherboard (LOM) because it is embedded in a motherboard 107 of host 102. In other embodiments, network controller 104 is implemented as a network adapter card, commonly referred to as a Network Interface Card (NIC) that is attached to a peripheral or expansion slot (not depicted) in motherboard 107. In the depicted implementation, network controller communicates with host 102 via an industry standard peripheral bus 109. A suitable candidate for peripheral bus 109 is a PCI Express (PCI-E) bus.

Information handling system 100 as shown in FIG. 1 includes multiple management controllers. In some embodiments, first management controller 106 and second management controller 108 are implemented as duplicate or redundant instances of one type of management controller. In other embodiments, first management controller 106 is a first type of management controller and second management controller 108 is a second type. In some embodiments, for example, first management controller 106 is a baseboard management controller (BMC) while second management controller 108 represents a remote access card (RAC).

In some embodiments, a BMC includes a controller, typically embedded on motherboard 107, dedicated to management services. One or more sensors 118 built into system 100 indicate system parameters such as temperature, cooling fan speeds, power mode, operating system (OS) status. In some embodiments, the BMC monitors the sensors and can send alerts to a system administrator if any of the parameters do not stay within preset limits, indicating a potential failure of the system. The BMC also preferably enables an administrator to take basic corrective action including, as examples, asserting a system reset or causing a power cycling the system.

In some embodiments, a RAC is an interface card that may have its own processor, memory, battery, network connection, and access to the system bus. A RAC preferably facilitates remote OOB management. A RAC may include design features of commercially distributed remote access cards such as the Dell Remote Access Card (DRAC) from Dell, Inc. The DRAC supports or enables remote power management, virtual media access, and a remote console, all of which are accessible through a supported web browser. The DRAC enables administrators to configure a system as if they were sitting at the local terminal.

In embodiments of information handling system 100 employing two or more different types of management controllers, it is possible that the various management interfaces 110-113 are also different from one another. As an example, for embodiments in which first management controller 106 is a BMC, first management interface 110 may include an Intelligent Platform Management Interface (IPMI) driver using a Keyboard Controller Style (KCS) protocol compliant interface as first management interface 110. IPMI is a well known and widely implemented specification that defines a set of computer hardware and firmware interfaces administrators can use to monitor system health and manage the system. IPMI operates independently of the host operating system (OS) and allows administrators to manage a system remotely even in the absence of host power and/or a functional host OS. The fourth management interface 113, which enables direct communication between first management controller 106 and second management controller 108 may, for example, be implemented as an Intelligent Management Platform Bus (IPMB). IPMB is an interface specification that defines an internal management, I2C-type bus for extending system management within a chassis.

The IPMI-type and I2C derivative interfaces described above as examples of first management interface 110 and fourth management interface 113 may be characterized as comparatively slow and simple. In contrast, embodiments of information handling system 100 employing a RAC or other advanced type of management controller for second management controller 108 may employ an OOB interface that is comparatively fast and/or sophisticated. In some embodiments, for example, third management interface 112 coupling second management controller 108 to network controller 104 may be implemented, for example, as a UMP interface over a Media Independent Interface (MII) or IEEE 802.3u bus. In this embodiment, second firmware module 117 includes code providing the necessary UMP interface. An MII bus a generic bus capable of connecting different types of physical blocks to a common network controller. A Reduced MII bus may also be substituted for the MII bus.

Completing the description of the example implementation of information handling system 100 depicted in FIG. 1, second management interface 111 may be implemented using IPMI over a System Management Bus (SMBus). In this embodiment, first firmware module 116 of network controller 104 includes code providing the necessary IPMI interface. SMBus is a I2C derivative bus sometimes used to communicate with comparatively low-bandwidth devices on a motherboard. SMBus voltage levels are different than those of I2C, but there is substantial interoperability between SMBus and I2C.

It should be emphasized that the implementation of information handling system 100 as described above is merely exemplary, particularly with regard to the description of specific types of management controllers and specific types of interfaces and protocols. Other management controller, interfaces, and protocols may be used in lieu of those described herein. For example, an NC-SI interface may be used in lieu of the UMP interface provided by the previously described implementation of second firmware module 117. NC-SI is an emerging DTMF standard for a NIC-sideband interface suitable for MII or reduced MII implementations.

As described above, those of ordinary skill in system design will appreciate that there may be significant differences between IB and OOB management implementations and, similarly, between local and remote management implementations. As described above, for example, local IB access to or control of management controllers 106, 108 involves host hardware interface drivers whereas remote OOB access to or control of management controllers 106, 108 is achieved directly over standard IP-based Ethernet connections. This implementation differences undesirably increase solutions costs, development and validation schedules, and the complexity of the final product.

Moreover, the implementation of information handling system 100 depicted in FIG. 1 includes a network controller 104 that routes and filters OOB management traffic to two or more management controllers (106, 108), but the implementation is limited because network controller 104 supports filtering only for remote traffic (i.e., traffic between external network 120 and management controllers 106, 108. In addition, network controller 104 as illustrated employs two or more firmware modules 116, 117 including a module to support each of the two or more different types of management controllers 106, 108 and their corresponding OOB management interfaces 111, 112.

The use of multiple firmware modules in network controller 104 is generally undesirable. Moreover, because network controller 104 is not able to load interface support for both management controllers simultaneously, communication between management controllers cannot traverse the network controller and, therefore, is it undesirably necessary to include the fourth management interface 113 for this purpose.

Figure 2:
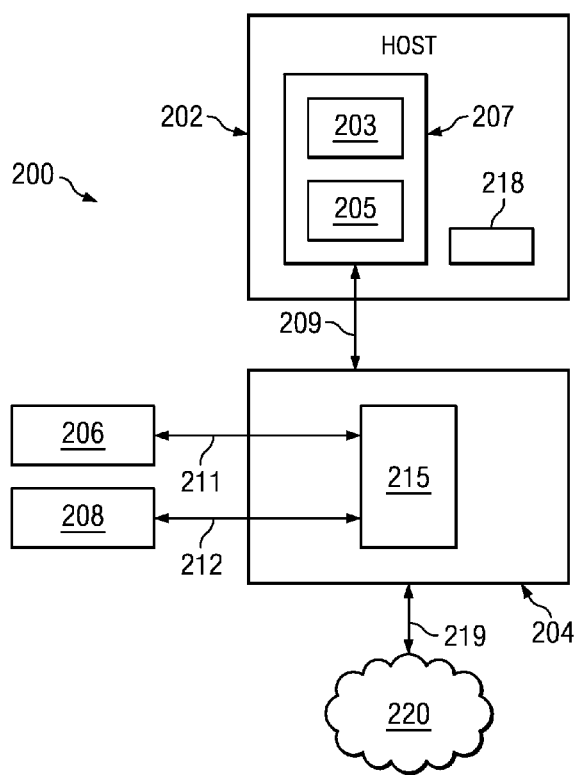
FIG. 2 shows selected elements of an embodiment of an information handling system employing a unified management firmware module and unified management busses, in accordance with the present invention.

Turning now to FIG. 2, selected elements of an embodiment of an information handling system 200 employing a unified management firmware module and unified management busses as described in greater detail below is depicted. Information handling system 200 includes a host 202, a network interface resource (NIR) 204 in communication with host 202 via an I/O bus 209. A first management controller (MC) 206 communicates with NIR 204 via a first unified management bus (UMB) 211. A second management controller (MC) 208 communicates with NIR 204 via a second unified management bus 212. NIR 204 connects information handling system 200 to an external network 220 via a network connection 219.

Host 202, like host 102 of information handling system 100 depicted in FIG. 1, includes one or more CPU's 203 connected to a motherboard 207 and storage 205. I/O bus 209 is may be implemented as a PCI-E bus or as another suitable peripheral bus. NIR 204 may be implemented as an LOM and may be referred to herein as LOM 204. In other embodiments, NIR 204 may be included as part of an adapter card, e.g., a NIC. In some embodiments, first MC 206 is a comparatively simple or slow management controller while second MC 208 is a comparatively complex or fast management controller. As examples, first controller 206 may be a BMC connected to NIR 204 via a relatively simple interconnection such as an I2C connection or an I2C derivative.

LOM 204 preferably supports multiple MAC (Media Access Control) addresses and includes flexible filters. Using these resources LOM 204 is preferably enabled to redirect incoming packets addressed to a management controller without directing the packet to host 202. In conventionally implemented systems, management packet routing is only provided for the traffic between external network 220 and one of the embedded controllers or traffic from one of the embedded controllers to external network 220. In information handling system 200, NIR 204 is preferably configured to filter and route local management packets, i.e., packets between host 202 and management controllers 206 and/or 208, and remote traffic, packets between an external resource (not depicted) connected to external network 220 and management controllers 206 and/or 208.

LOM 204 as depicted includes a unified management module UMM (215). In desirable implementations, UMM 215 represents a single firmware element of NIR 204 that facilitates management traffic. In the embodiment depicted in FIG. 2, for example, UMM 215 routes local management traffic as well as remote management traffic. In addition, UMM routes management traffic to multiple management controllers including first MC 206 and second MC 208.

FIG. 3 is a conceptual representation of selected elements of one embodiment UMM 215. As depicted in FIG. 3, UMM 215 includes a filter/routing layer 302, a hardware abstraction layer 304, and one or more interconnect-specific interfaces, two of which are represented by reference numerals 306-1 and 306-2 (collectively or generically referred to herein as interfaces 306). Although the depicted implementation of UMM 215 includes two interfaces 306-1 and 306-2, more or fewer interfaces may be accommodated in other implementations.

Filter/routing layer 302 detects destination addresses in packets received by LOM 204. Filter/routing layer 302 determines whether the detected destination address corresponds to a physical address of a management controller. In some embodiments, including embodiments in which network interconnect 219 is an Ethernet interconnect, the destination addresses is or includes a MAC address of the destination management controller. If the destination address of a packet matches to the physical address of a management controller and LOM 204 locates the physical address, filter/routing layer 302 forwards the packet to hardware abstraction layer 304.

Hardware abstraction layer 304 abstracts hardware interfaces from filter/routing layer 302. When a packet is forwarded from filter/routing layer 302 to hardware abstraction layer 304, hardware abstraction layer 304 executes the appropriate interface 306-1 or 306-2 to place the packet on the appropriate physical bus. Interfaces 306-1 and 306-2 include low level instructions that emulate hardware corresponding to the applicable physical bus. If, as an example, first MC 206 supports an I2C or I2C derivative (e.g., SMBus, IPMB, or the like), physical connection with LOM 204, first interface 306-1 includes low level instructions to place a received packet onto the I2C or I2C derivative bus. As stated previously, the particular protocol or interface used in a specific embodiment is an implementation detail and any suitable management protocol or management interface may be used. For example, first interface 306-1 may provide an IPMI interface and second interface 306-2 may provide a UMP or NC-SI interface.

In some embodiments, filter/routing layer 302 determines whether a packet is destined for a management controller within the LOM's domain by accessing a table or data structure. Referring to FIG. 4, an exemplary such table 400 is illustrated. As depicted in FIG. 4, table 400 includes a first column 402, a second column 404, and a set of entries or rows 406-1 through 406-3 (generically or collectively referred to herein as entry or entries 406). Each entry 406 represents a management controller and its physical interface. First column 402 indicates the address of an entry's physical interface and second column 404 indicates the MAC address of the interface. Table 400 may be generated when the system is booted or during operation. Table 400 may be created by filter/routing layer 302 or by a module in an operating system of host 202.

As described above, some embodiments may be implemented as a set of computer executable instructions (software) for filtering and routing management traffic over a single physical interface regardless of whether the traffic is local or remote. The instructions are stored on a computer readable medium such as a storage resource located on LOM 204. In one embodiment, for example, the software is stored in UMM 215.

Referring to FIG. 5, a flow diagram illustrating selected elements of a method 500 of handling management traffic in an information handling system. In the depicted embodiment, method 500 includes receiving (block 502), by an LOM or other NIR, a packet having a destination address of one of one or more management controllers of the information handling system. In some embodiments, management traffic is based on Ethernet packets. The management traffic may originate from a host of the information handling system or from an external or remote system and delivered to the information handling system via an external network.

The management traffic is forwarded (block 504) to filter/routing layer 302 of UMM 215. Filter/routing layer 302 then determines (block 506) whether the destination MAC address or other form of destination address matches any of the destination addresses stored in a table 400 of management controller interfaces and their corresponding controller MAC addresses (see FIG. 4). If (block 508) no match is found between the destination MAC address of the management packet and any entry in table 400, the packet is discarded (block 510).

If the destination MAC address matches an entry in table 400, the filter/routing layer 302 forwards (block 512) the management packet to hardware abstraction layer 304. Hardware abstraction layer 304 then converts or formats (block 514) the packet as received by LOM 204 to a format or protocol compatible with the interface between LOM 204 and first MC 206 or second MC 208 using interface specific modules 306-1 or 306-2. Hardware abstraction layer 304 then places (block 516) the formatted packet onto the appropriate physical interface for transmitting to the appropriate MC. It will be appreciated that the unified management busses disclosed herein unify the delivery of remote and local management packets to a management controller.

Although the disclosed embodiments have been described in detail, it should be understood that various changes, substitutions and alterations can be made to the embodiments without departing from their spirit and scope

What is claimed is:

1. A network interface resource, comprising:
a processor;
a non-transitory computer readable medium;
a unified management module including instructions in the computer readable medium, the instructions executable by the processor and configured to cause the processor to:
receive a first management packet from a host for the network interface resource;
forward the first management packet to a first management controller via a first unified management bus using a first interface comprising an intelligent platform management interface included with the unified management module, the first management controller including a baseboard management controller and the first unified management bus selected from an I2C bus and an I2C derivative bus;
receive a second management packet from the host;
forward the second management packet to a second management controller via a second unified management bus comprising a network controller sideband interface (NC-SI) using a second interface comprising a sideband interface included with the unified management module;
receive a third management packet from a remote resource accessible via an external network;
forward the third management packet to the first management controller via the first unified management bus using the first interface;
receive a fourth management packet from the remote resource; and
forward the fourth management packet to the second management controller via the second unified management bus using the second interface.

2. The network interface resource of claim 1, wherein the unified management module further includes instructions configured to cause the processor to:
format the first management packet and the third management packet for transmission using the first interface; and
format the second management packet and the fourth management packet for transmission using the second interface.

3. The network interface resource of claim 1, wherein the unified management module further includes instructions configured to cause the processor to:
format the first management packet and the third management packet for receipt by the first management controller; and
format the second management packet and the fourth management packet for receipt by the second management controller.

4. The network interface resource of claim 1, wherein the network interface resource includes a network interface card coupled to the host via a peripheral connect interface (PCI) bus.

5. The network interface resource of claim 1, wherein the network interface resource includes a local-area-network-on-motherboard network interface that is embedded in a motherboard of the host.

6. A method, comprising:
receiving, at a network interface resource, a first management packet from a host for the network interface resource;
forwarding the first management packet to a first management controller via a first unified management bus using a first interface comprising an intelligent platform management interface, the first management controller including a baseboard management controller and the first unified management bus selected from an I2C bus and an I2C derivative bus;
receiving, at the network interface resource, a second management packet from the host;
forwarding the second management packet to a second management controller via a second unified management bus comprising a network controller sideband interface (NC-SI) using a second interface comprising a sideband interface;
receiving, at the network interface resource, a third management packet from a remote resource accessible via an external network;
forwarding the third management packet to the first management controller via the first unified management bus using the first interface;
receiving, at the network interface resource, a fourth management packet from the remote resource; and
forwarding the fourth management packet to the second management controller via the second unified management bus using the second interface.

7. The method of claim 6, further comprising:
formatting, at the network interface resource, the first management packet and the third management packet for transmission using the first interface; and
formatting, at the network interface resource, the second management packet and the fourth management packet for transmission using the second interface.

8. The method of claim 7, further comprising:
formatting the first management packet and the third management packet for receipt by the first management controller; and
formatting the second management packet and the fourth management packet for receipt by the second management controller.

9. The method of claim 6, wherein the network interface resource is a network interface card coupled to the host via a peripheral connect interface (PCI) bus.

10. The method of claim 6, wherein the network interface resource is a local-area-network-on-motherboard network interface that is embedded in a motherboard of the host.

11. A computer program product comprising a tangible, non-transitory computer readable medium including instructions for causing a processor to:
- receive, at a network interface resource, a first management packet from a host for the network interface resource;
- forward the first management packet to a first management controller via a first unified management bus using a first interface comprising an intelligent platform management interface, the first management controller including a baseboard management controller and the first unified management bus selected from an I2C bus and an I2C derivative bus;
- receive, at the network interface resource, a second management packet from the host;
- forward the second management packet to a second management controller via a second unified management bus comprising a network controller sideband interface (NC-SI) using a second interface comprising a sideband interface;
- receive, at the network interface resource, a third management packet from a remote resource accessible via an external network;
- forward the third management packet to the first management controller via the first unified management bus using the first interface;
- receive, at the network interface resource, a fourth management packet from the remote resource; and
- forward the fourth management packet to the second management controller via the second unified management bus using the second interface.

12. The computer program product of claim 11, wherein the computer readable medium further includes instructions for causing the processor to:
- format, at the network interface resource, the first management packet and the third management packet for transmission using the first interface; and
- format, at the network interface resource, the second management packet and the fourth management packet for transmission using the second interface.

13. The computer program product of claim 11, wherein the computer readable medium further includes instructions for causing the processor to:
- format the first management packet and the third management packet for receipt by the first management controller; and
- format the second management packet and the fourth management packet for receipt by the second management controller.

* * * * *